June 24, 1958
J. R. JOHNSON ET AL
2,839,821
APPARATUS FOR FOLDING AND ASSEMBLING
WIPER PADS IN METAL CLIPS
Filed July 29, 1954
6 Sheets-Sheet 6
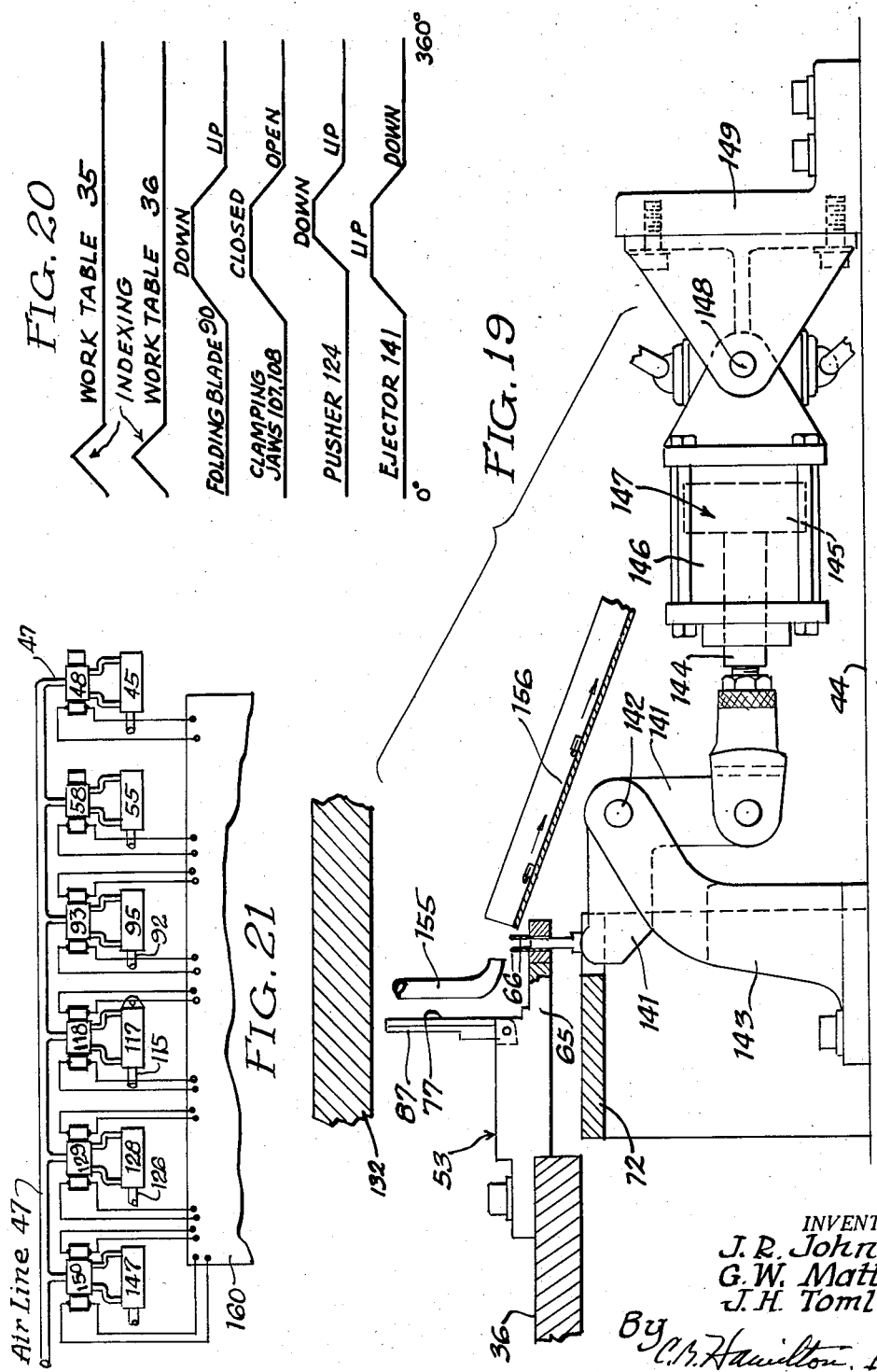
INVENTORS:
J. R. Johnson
G. W. Mattson
J. H. Tomlin
By C. B. Hamilton, Att'y United States Patent Office 2,839,821
Patented June 24, 1958

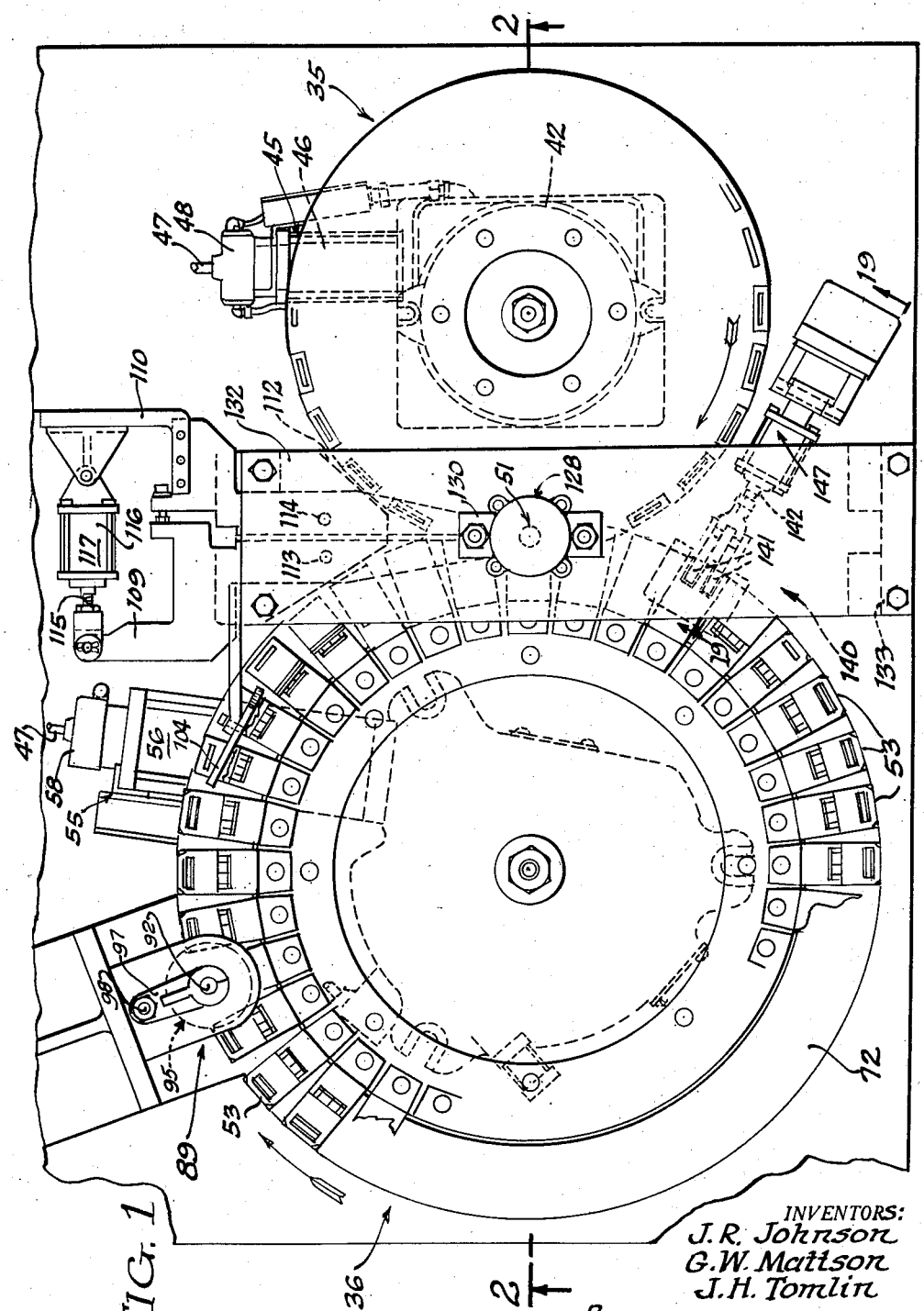

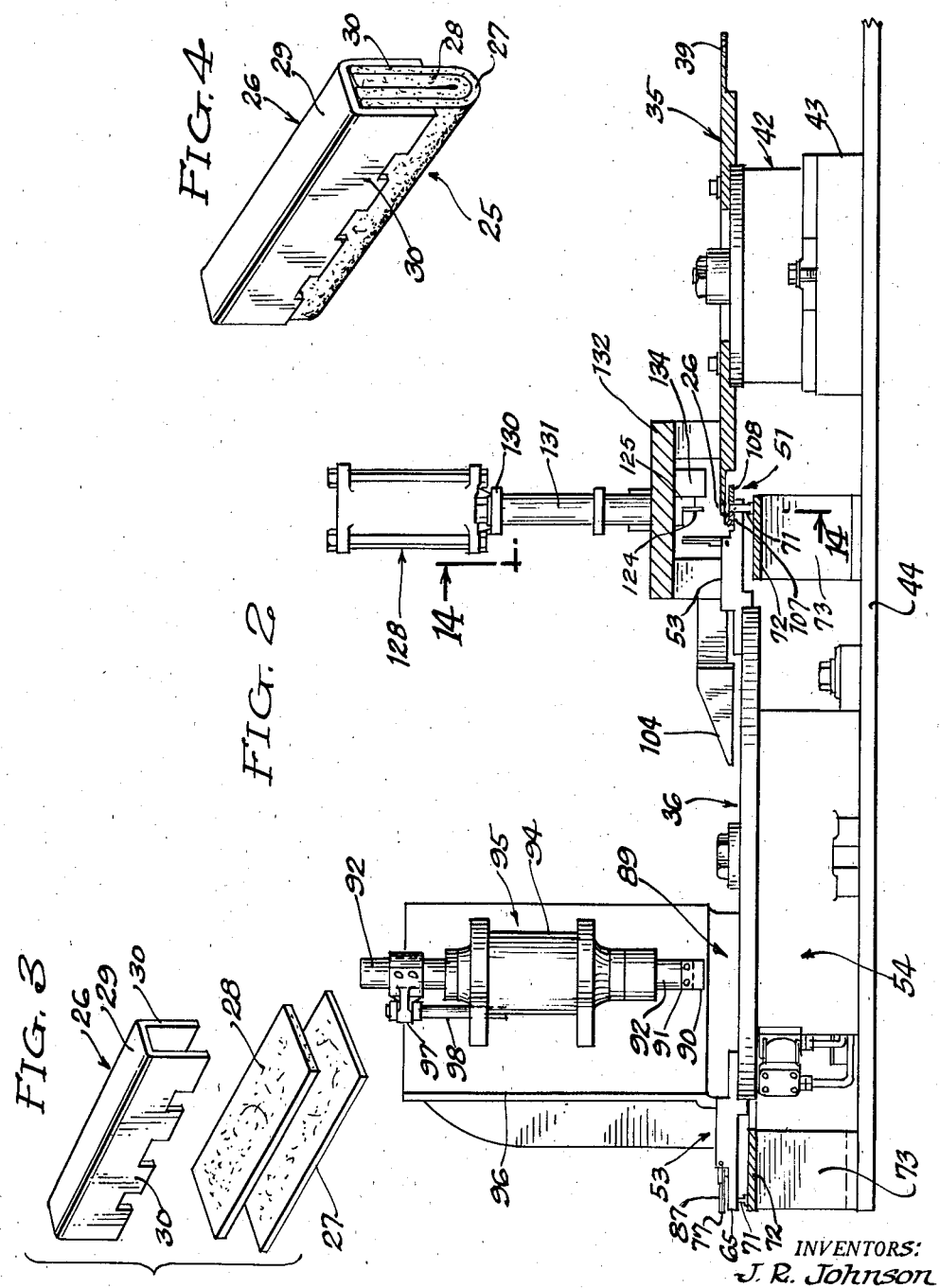

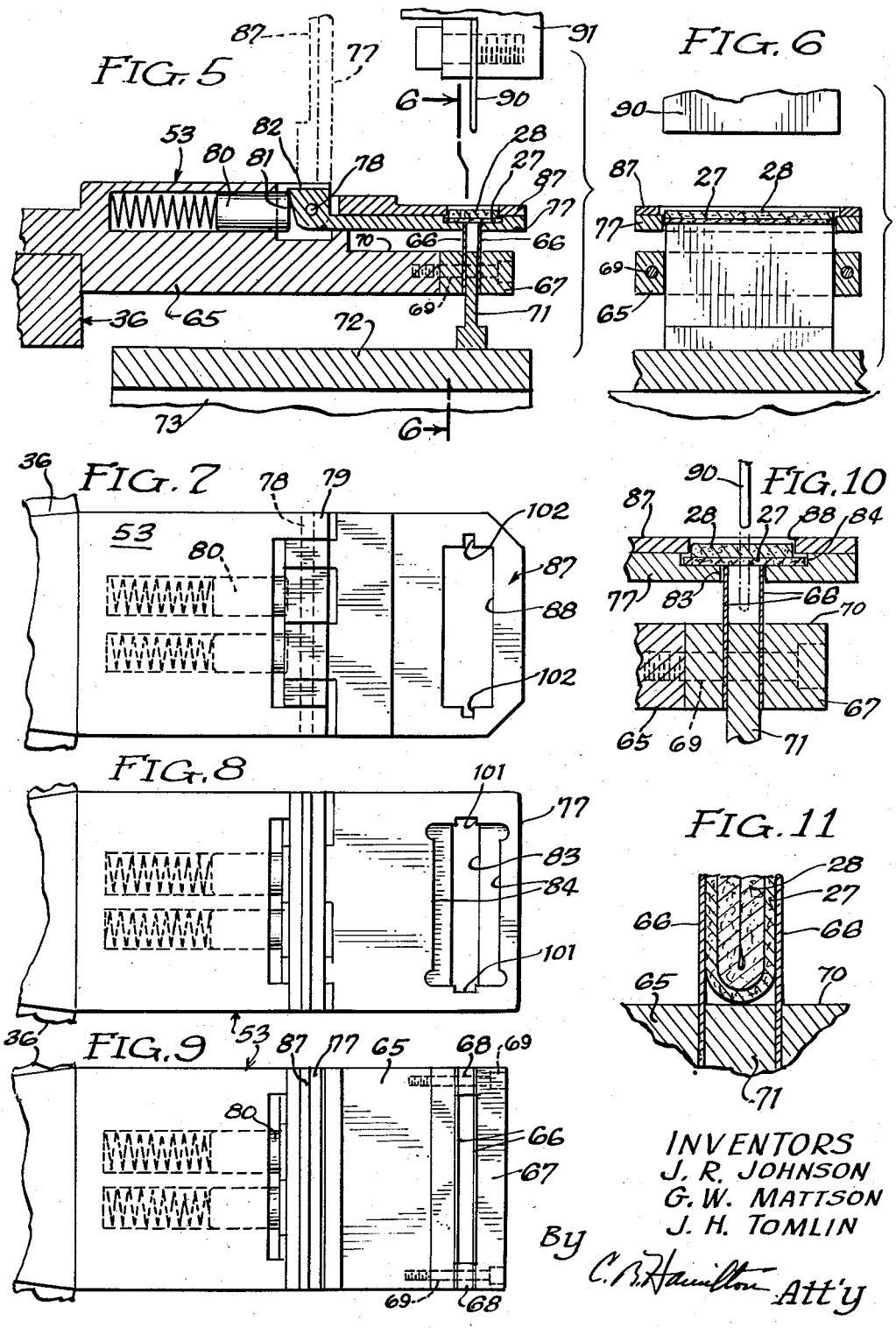

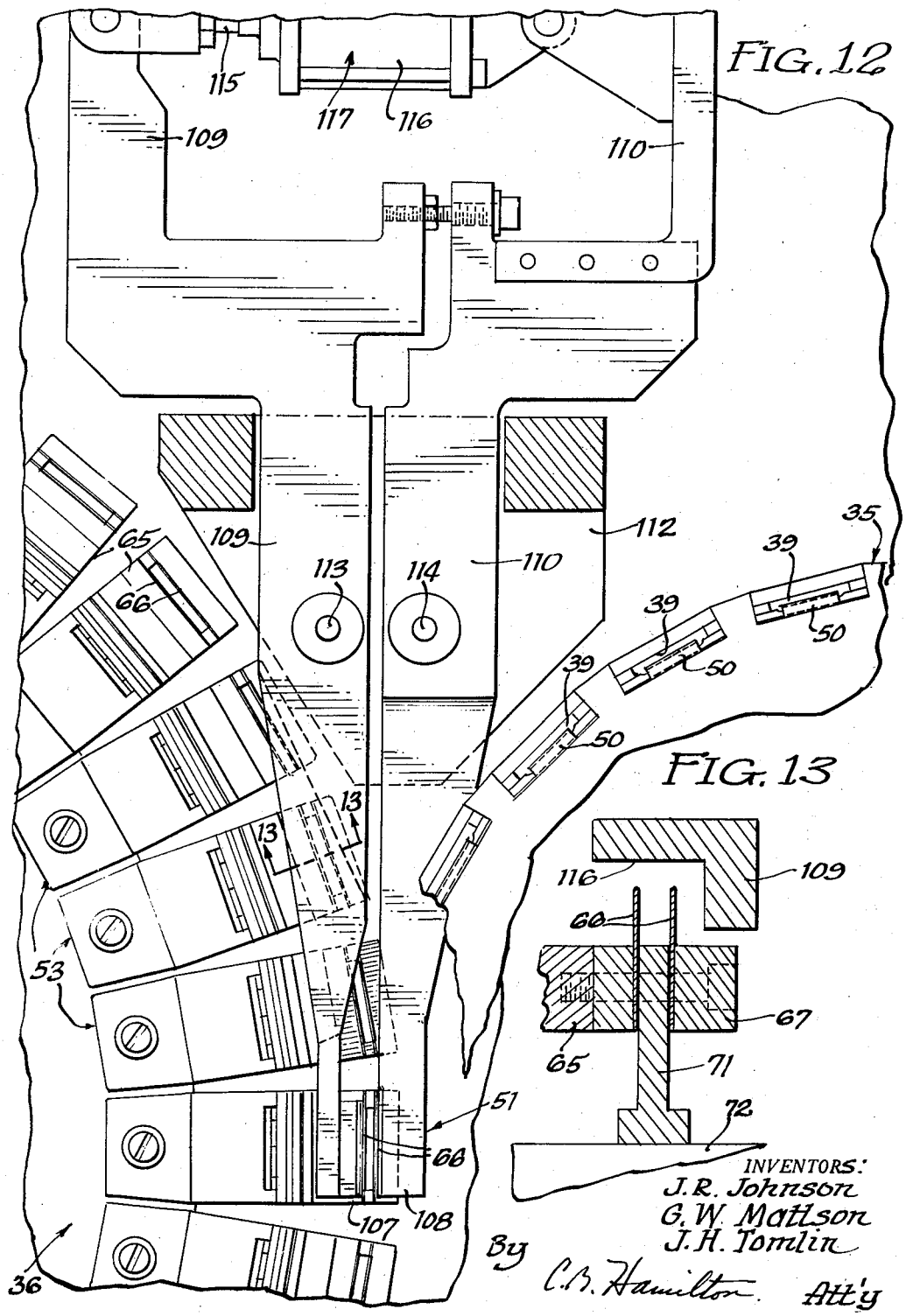

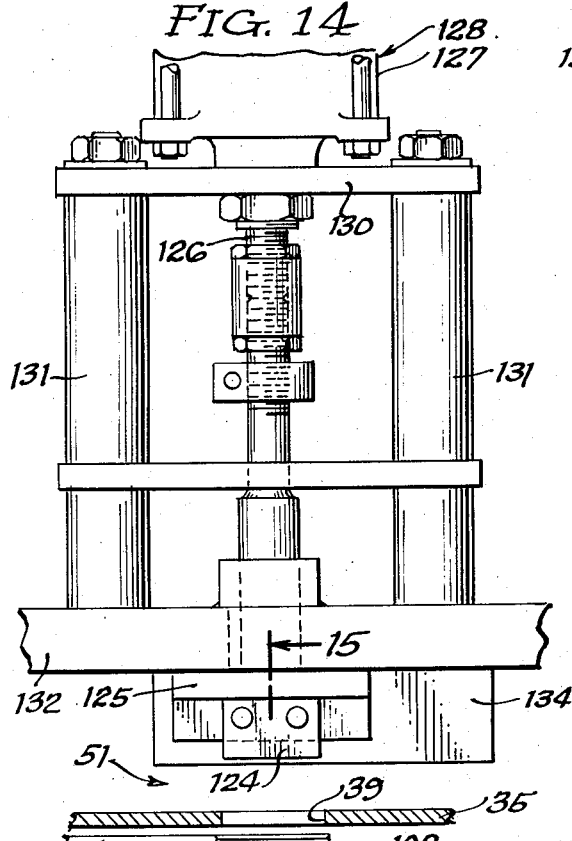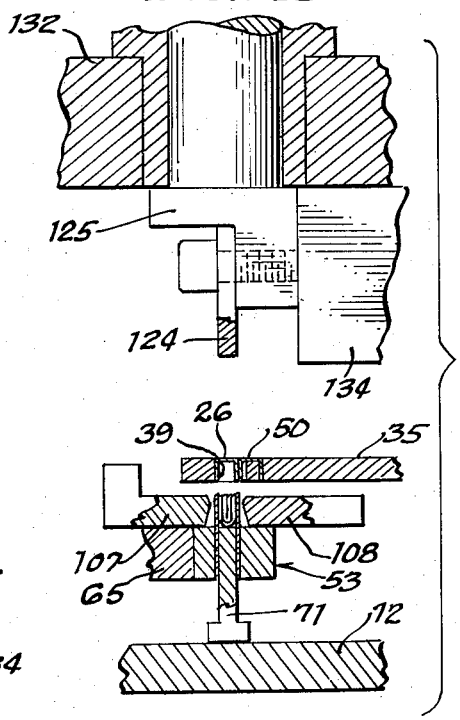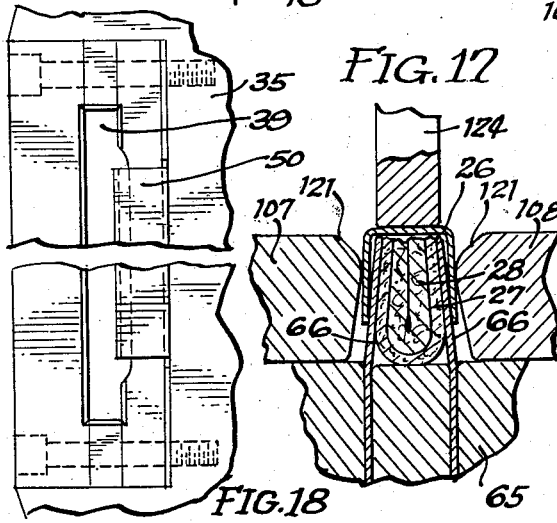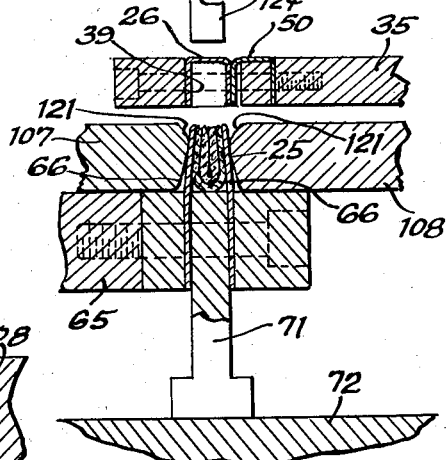

2,839,821
APPARATUS FOR FOLDING AND ASSEMBLING WIPER PADS IN METAL CLIPS

Joel R. Johnson, Chicago, Gust W. Mattson, Cicero, and James H. Tomlin, La Grange, Ill., assignors to Western Electric Company, Incorporated, New York, N. Y., a corporation of New York Application July 29, 1954, Serial No. 446,614

8 Claims. (Cl. 29—235)

The present invention relates to apparatus for folding and assembling articles and more particularly to an apparatus for folding strips of material and assembling them in metal clips to form wiper pad assemblies.

An object of the invention is to provide mechanism for aligning and folding a plurality of strips of material to make wiper pads.

Another object of the present invention is to provide an apparatus for folding wiper pads and assembling them in holders.

An apparatus illustrating certain features of the invention for folding and assembling wiper pads in metal clips may include a pair of intermittently rotatable feed tables with portions thereof in overlapping relation and with the first feed table provided with a plurality of regularly spaced nests for holding the metal clips therein which are manually inserted in the nests. The second feed table has a plurality of fixtures, each of which comprise a fixed lower apertured member for supporting a pair of spaced parallel vertically disposed thin flexible retaining plates and each fixture has pivoted members for supporting a pair of flat strips of fabric above the plates in a predetermined aligned position. The second feed table is indexed to bring successive fixtures to a folding station where a reciprocable blade engages the two strips of fabric along the centerline thereof and presses them between the flexible retaining plates to fold them along the median centerline to form a wiper pad which is retained by the plates as the blade is retracted. The pivoted members are swung away from the retaining plates and the folded pad therebetween as the work tables are indexed to position a fixture with the retaining plates and the folded wiper pad of the second table in alignment with a clip in the first work table and between a pair of jaws which are actuated to compress the retaining plates and the pad therebetween while a plunger disposed above the first work table descends to press the U-shaped clip over and onto the retaining plates and the folded pad therebetween. The work tables are then indexed to position the fixture with the folded pad and the clip thereon at an ejecting station where a plunger disposed between the retaining plates of the fixture is actuated to eject the wiper pad from between the retaining plates and cause the clip to slide off of the plates and grip the wiper pad in assembled relation, and a blast of air from a nozzle blows the assembled wiper pad into a receptacle.

Other objects and advantages of the invention will become apparent by reference to the following detailed description and the accompanying drawings illustrating a preferred embodiment of the invention, in which Fig. 1 is a plan view of the apparatus;

Fig. 2 is a vertical sectional view taken along line 2—2 of Fig. 1;

Fig. 3 is a perspective view of the elements of the wiper pad in separated relation to each other;

Fig. 4 is a perspective view of the wiper pad in assembled relation;

Fig. 5 is a fragmentary vertical sectional view taken along the line 5—5 of Fig. 1 through one of the pad supporting fixtures on one of the rotatable work tables at the folding station;

Fig. 6 is a vertical cross-sectional view taken along the line 6—6 of Fig. 5;

Fig. 7 is a plan view of one of the fixtures showing a pair of pivoted holding members for supporting and aligning a pair of strips of fabric in alignment with the retaining plates;

Figs. 8 and 9 are views similar to Fig. 7 showing the holding members in different positions;

Fig. 10 is an enlarged fragmentary view of a portion of the fixture showing the holding members and the strips of fabric of the wiper pads aligned therewith before they are folded;

Fig. 11 is a fragmentary sectional view showing the strips of the wiper pad after they have been folded;

Fig. 12 is an enlarged fragmentary plan sectional view of a portion of the apparatus showing the jaws for compressing the retaining plates and the wiper pad prior to the pressing of the clip thereon;

Fig. 13 is a detailed vertical sectional view taken on the line 13—13 of Fig. 12;

Fig. 14 is a fragmentary vertical sectional view taken along the line 14—14 of Fig. 2;

Fig. 15 is a fragmentary vertical sectional view taken along the line 15—15 of Fig. 14;

Fig. 16 is an enlarged fragmentary view of a portion of the structure shown in Fig. 15;

Fig. 17 is a fragmentary enlarged vertical sectional view of the structure shown in Fig. 16 showing the clip pressed onto the retaining plates and the wiper pad therebetween;

Fig. 18 is an enlarged fragmentary plan view of a nest on one of the work tables for receiving the U-shaped clip therein;

Fig. 19 is a vertical sectional view taken along the line 19—19 of Fig. 5;

Fig. 20 is a diagrammatic view illustrating the sequence of operation of various actuating elements of the apparatus during a cycle of operation, and Fig. 21 is a diagrammatic view of the fluid actuations of the apparatus and the electrical controls therefor.

The present apparatus is designed to assemble a wiper pad 25 into a brass clip 26 (Figs. 3 and 4). The wiper pad 25 comprises a rectangular strip 27 of a predetermined length of Gamal cloth and a rectangular strip 28 of flannel cloth having a length the same as that of the strip 27 and the clip 26 and having a predetermined width less than that of the strip 27. The strip 28 is placed upon the strip 27 with their median centerlines in alignment and are then folded about the centerline, compressed and moved into the clip 26 with the edges of the strips engaging the transverse wall 29 of the clip, after which the pad is allowed to expand into engagement with the parallel side walls 30 thereof and be retained therein in assembled relation.

The apparatus (Figs. 1 and 2) comprises a pair of intermittently rotatable work tables 35 and 36 mounted in spaced relation to each other with portions thereof in overlapping relation. The table 35 has twenty-four rectangular apertures therein forming nests or seats 39 for receiving the brass clips 26 and is mounted on and intermittently driven by a well known type of commercial indexing unit 42 which mounted on a block 43 is secured to a base 44. The indexing unit 42 is actuated by a pneumatic actuator 45 including a reciprocable piston and a cylinder 46 which is connected to a compressed air line 47 and is actuated under control of a solenoid actuated valve 48. The brass clips 26 are manually inserted in the nests 39 on the feed table 35 and are yieldably retained therein by leaf springs 50. As the table 35 is indexed successive ones of the clips 26 are advanced to an assembling station 51 where they are pushed from the nest onto the folded wiper pad.

The table 36 has a plurality of wiper pad aligning and holding fixtures 53 fixed thereto and extending radially outwardly therefrom, and the table 36 is mounted on and intermittently rotated by a well known commercial type of indexing mechanism or unit 54 which is secured to the base 44 and includes a pneumatic actuator 55 having a piston reciprocable within a cylinder 56. The actuator 55 is connected to the compressed air line 47 and is actuated under control of a solenoid valve 58. The solenoid valves 48 and 58 are connected to a control circuit for simultaneously actuating them to effect the simultaneous indexing of the feed tables 35 and 36.

Each of the wiper pad holding fixtures 53 comprises a plate 65 (Figs. 5 and 9) fixed to the table 36 and extending radially and horizontally therefrom and having a pair of relatively thin flexible retaining plates 66 mounted thereon in spaced and parallel relation to each other. The retaining plates 66 extend across the width of the fixed plates 65 and are secured thereto in spaced relation to each other by a clamping bar 67, spacers 68, and screws 69, as shown in Fig. 9. Portions of the plates 66 equal in length to that of the pad 25 and the clip 26 extend upwardly above the upper flat surface 70 of the fixed plate 65, and the upper edges of the plates 66 are round and polished to provide smooth folding surfaces about which the strips 27 and 28 are folded. The aperture formed between the spacer blocks 68 and the folding plates 66 receives the upper portion of a rectangular plunger 71, the upper end surface of which is parallel with the upper surface 70 of the plate 65, and the lower enlarged end of which rides on the upper flat surface of an annular supporting member 72 which is mounted on the upper end of a plurality of brackets 73 fixed to the base 44.

A holder and aligning member 77 is provided for supporting the strip 27 of Gamal cloth in a predetermined aligned position adjacent the upper edges of the retaining plates 66. The member 77 in the form of a plate is pivotally supported on a pin 78 mounted in bearings 79 of the plate 65 for movement to and from vertical and horizontal positions and is yieldably maintained in either position by a spring pressed plunger 80 which cooperates with flat surfaces 81 and 82 on the member 77. An elongated opening 83 is formed in the member 77 for receiving the upper edge portions of the retaining plates 66 therein, and recesses 84 extending laterally from the opening 83 form a rectangular seat for receiving the strip 27 to support and align it in a predetermined position relative to the plates 66. A flat aligning member 87 pivotally mounted on the pin 78 for movement to and from horizontal and vertical positions has a rectangular opening 88 for receiving and aligning the strip 28 in a predetermined position on the strip 27.

With the strips 27 and 28 in the aligning fixture 53, the rotatable table 36 is successively indexed until the fixture arrives at a folding station 89 (Fig. 1) in alignment with a folding blade 90 (Figs. 2, 5 and 6). The folding blade 90 is mounted on a head 91 fixed to a piston rod 92 of a piston reciprocable in a cylinder 94 of a pneumatic actuator 95 which is mounted on a frame 96 fixed to the base 44. At the upper end of the piston rod 92 is mounted an arm 97 from which depends a rod 98 which is slidably engageable with a part of the frame 96 for preventing rotation of the piston and the folding blade 90. The actuator 95 is connected to the compressed air line 47 for actuating it under control of a solenoid control valve 93 (Fig. 21).

The folding blade 90 is aligned with the center of the strips 27 and 28 in the fixture 53 at the folding station 89 and is adapted to move downwardly and push the strips over the upper folding edges of the plates 66 and between the plates to cause the strips 27 and 28 to be folded upon themselves along a median centerline thereof (Figs. 5 and 10), after which the blade 90 is retracted, leaving the folded strips 27 and 28 of the pad 25 yieldably gripped between the plates 66 (Fig. 11). The blade 90 has width slightly greater than the length of the wiper pad 25 so that the end portions thereof extend beyond the strips 27 and 28 and pass through clearance notches 101 and 102 formed in the strip aligning members 77 and 87.

After the strips 27 and 28 have been folded and inserted between the retaining plates 66, the table 36 is indexed until the fixtures 53 reach the assembling station 51 where the folded pad 25 is positioned below the clip 26 in the table 35. As the fixtures 53 are advanced from the folding station 89 to the assembling station 51, the pivoted aligning members 77 and 87 are cammed upwardly to a vertical position by a cam member 104 (Fig. 1) having an inclined cam surface engageable therewith and mounted in the path of travel of said pivoted aligning members 77 and 87.

The folded wiper pad 25 and the upper end of the retaining plates 66 when they reach the assembling station 51 are disposed between a pair of jaws 107 and 108 which are disposed beneath the work table 35 and above the work table 36 and have sloping faces engageable with the folding plates 66 for flexing them and compressing the wiper pad 25 therebetween. The jaws 107 and 108 are mounted on the ends of a pair of horizontally disposed levers 109 and 110 pivotally mounted on a bracket 112 for pivotal movement about pins 113 and 114. At their other ends the levers 109 and 110 are connected to a piston rod 115 and a cylinder 116 respectively of a fluid actuator 117 which is connected to the compressed air line 47 and actuated under control of a solenoid valve 118 (Fig. 21). To permit the upper folding plate 66 to pass across the lever 109 into the assembly station 51, the lever 109 is shaped to provide clearance therefor as shown at 119 in Figs. 12 and 13. When actuated, the jaws 107 and 108 serve to compress the retaining plates 66 and the wiper pads 25 so that they will fit between the walls 30 of the clip 26 as the clip is pushed downwardly onto the pad and the retaining plates (Figs. 16 and 17). As the clip 26 is forced down onto the folding plates and the wiper pad 25 by a pusher element or plunger 124, chamfered edges 121 on the jaws 107 and 108 aid in guiding the walls 30 of the clip 26 between the folding plate 66 and the jaws 107 and 108, the latter of which separate to accommodate the walls 30 of the clip.

The pusher element 124 is mounted on a head 125 fixed to a piston rod 126 of a piston reciprocable within a cylinder 127 of a pneumatic actuator 128 which is connected to the compressed air line 47 and actuated under control of a solenoid valve 129. The actuator 128 is mounted on a supporting plate 130 which is secured to a pair of posts 131 fixed to a horizontally disposed frame plate 132, which in turn overlies and extends across a portion of the tables 35 and 36 and is supported on the bracket 112 and a bracket 133 fixed to the base 44. A bar 134 secured to the underside of the frame plate 132 has a flat face engageable with a flat face of the head 125 to prevent turning movement of the head and pusher element 124 in response to the downward movement of the piston 127.

The folded wiper pad 25 gripped between the retaining plates 66 and having the brass clip 26 mounted thereon as shown in Fig. 17 is carried by the fixture 53 and the table 36 from the assembling station 51 to an ejector station 140 (Fig. 1) where the fixture 53 and the plunger 71 are disposed above the bifurcated ends of a bell crank ejecting lever 141 which is pivotally mounted at 142 on a bracket 143 fixed to the base 44. The other end of the bell crank lever 141 is connected to a piston rod 144 on a piston 145 reciprocable within a cylinder 146 of a fluid actuator 147. The cylinder 146 is pivotally mounted at 148 to a bracket 149 secured to the base 44. The fluid actuator 147 is connected to the compressed air line 47 and is actuated under control of a solenoid valve 150 associated therewith and connected to a control circuit for effecting the actuation of the ejector at predetermined intervals during each cycle of operation of the apparatus. Thus, in response to the forward movement of the piston 145 the ejecting lever 141 raises the ejecting plunger 71 which pushes the wiper pad 25 upwardly and ejects it from between the retaining plates 66 and simultaneously therewith the wiper pad 25 pushes the brass clip 26 off of the plates 66. As the wiper pad 25 is ejected from the plates 66 it expands into tight gripping engagement with the side walls 30 of the clip and is firmly retained therein. A blast of air from a nozzle 155 positioned adjacent the wiper pad assembly as it is ejected, blows the wiper pad assembly from the fixture 53 into a chute 156 which serves to guide the wiper pad assemblies into a suitable receptacle (not shown) for receiving them.

Each of the fluid actuators is connected to a source of compressed air under control of individual solenoid actuated valves associated therewith which are electrically connected to control circuits of a well known type of mechanism 160 having a motor driven timer and a rotatable cam shaft for closing and opening the circuits in a predetermined sequence to effect the actuation of the various elements of the apparatus in their proper relation one to another (Fig. 20) to effect the continuous operation of the apparatus.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for folding wiper pads and assembling them in U-shaped clips, the combination of a pair of relatively thin flexible plates having smooth rounded edges, a movable member for supporting said plates with portions thereof including said edges extending from the member in a predetermined spaced and parallel relation with each other and for movement to a plurality of stations, means on said member for supporting and aligning a flat pad adjacent said edges, means at one station engageable with an intermediate portion of said pad for pushing it between the plates to fold it and cause it to be retained therebetween, means at a second station for moving the flexible plates adjacent said edges toward each other to compress the folded pad therebetween, means at the second station for applying a U-shaped clip to and over the plates with the side walls of the clip disposed on the outside of the plates and the folded pad therebetween, means at a third station for ejecting the folded pad from between said plates to cause it to push the U-shaped clip off of said plates and into assembled relation with the pad, and means for moving the movable member from one station to the next.

2. In an apparatus for folding wiper pads and assembling them in U-shaped clips having side walls, the combination of a holder having a pair of plates mounted in spaced parallel relation to each other and having smooth upper edges, means for supporting and aligning a flat pad above and adjacent the upper edges of said plates, means engageable with an intermediate portion of said pad for compressing and pushing it between said plates to fold it, means for flexing the upper portions of the plates toward each other to compress the pad therebetween and receive the clip thereon, means for applying the U-shaped clip onto the plates with the side walls of the clip disposed on the outside of the plates and the folded pad therebetween, means for ejecting the folded pad from the plates to cause the clip to be pushed off of the plates into assembled relation with said pad, means for mounting the holder and the several means in a predetermined relation to each other and for relative movement therebetween whereby the holder and the several means may be brought sequentially into predetermined aligned and operative relation to each other, and means for effecting relative movement among the holder and the several means in a predetermined sequence to effect the folding of the pad and the assembly thereof with the U-shaped clip.

3. In an apparatus for folding wiper pads and assembling them in U-shaped clips with side walls, the combination of a pair of thin flat resilient plates having smooth upper edges, a carrier for supporting said plates in predetermined spaced and parallel relation to each other and for moving them to a plurality of stations, means on the carrier for supporting and aligning a plurality of strips of fabric adjacent the edges of said plates, means mounted at one station above the carrier for movement toward and away therefrom and engageable with an intermediate portion of said strips for pushing the strips between said plates to form a folded wiper pad, said plates retaining the folded pad therebetween, means at a second station for supporting a U-shaped clip above said plates with the side walls thereof extending downwardly, means at the second station for flexing the plates towards each other to position the upper edges thereof within the projected space between the side walls of said U-shaped clip, means at the second station for pushing a clip onto said plates with the side walls on the outside of the plates and the folded pad therebetween, and means at a third station for ejecting the folded pad from said plates to cause the pad to push the U-shaped clip off of the plates into assembled relation with said pad.

4. An apparatus for folding wiper pads and assembling them in U-shaped clips comprising an indexible carrier having a plurality of fixtures, each of said fixtures including a pair of relatively thin flexible plates mounted in spaced parallel relation to each other and means for supporting a flat pad in a predetermined position above said plates, means for indexing said carrier to position successive holders at a folding station, an assembling station, and an ejecting station, means at said folding station for pushing a flat pad between said plates to fold it and cause it to be retained thereby, means at said assembling station for supporting a U-shaped clip above and in vertical alignment with the folded wiper pad, means at the assembling station for moving the upper portions of the plates toward each other to compress the pad therebetween and to receive a clip thereon, means for pushing the clip onto the plates and the folded wiper pads therebetween, and means operable at said ejecting station for pushing the folded wiper pads from between the folding plates to cause it to push the U-shaped clip off of the folding plates into assembled relation with the pad.

5. An apparatus for folding wiper pads and assembling them in U-shaped clips comprising an indexible carrier having a plurality of spaced fixtures, each of said fixtures having a pair of relatively thin flexible plates mounted thereon in spaced parallel relation to each other, a first member pivotally mounted on said fixture for movement to an operative position adjacent said plates and having a seat for supporting a strip of fabric in a predetermined position above and adjacent said plates, a second member pivotally mounted on said fixture for movement to an operative position for positioning a second strip of fabric in a predetermined position on said first strip, means for indexing said carrier to position said fixtures successively at a folding station, an assembling station, and an ejecting station, means at said folding station for pushing the strips of fabric between said plates to cause them to be folded and retained by said plates, means operable during the movement of said fixture from said folding station to said assembling station for moving said first and said second members on said fixture from said operative positions to inoperative positions remote from said plates, means at said assembling station for supporting a U-shaped clip above and in vertical alignment with the folded wiper pad, means at the assembling station for moving the upper portions of the plates toward each other to compress the pad therebetween and to receive a clip thereon, means for pushing the clip onto the plates and the folded wiper pads therebetween, and means operable at said ejecting station for pushing the folded wiper pads from between the plates to cause it to push the U-shaped clip off of the plates into assembled relation with the pad.

6. An apparatus for folding wiper pads and assembling them in U-shaped clips with side walls comprising a first carrier having a plurality of nests for supporting said U-shaped clips with the side walls thereof extending downwardly, a second carrier having a plurality of holders, each of said holders comprising a pair of relatively thin flexible plates mounted in spaced parallel relation to each other and having smooth upper edges, means on said holders for supporting and aligning a plurality of strips of fabric adjacent the upper edges of said plates, means for pushing the strips between said plates to fold them to form a wiping pad and cause them to be retained therebetween, means mounting said carriers for movement and with a portion of the first carrier disposed above a portion of the second carrier at an assembling station, means for indexing said first and said second carriers to advance successive folded pads and clips into vertical alignment at said assembling station, means for flexing the plates towards each other adjacent said edges at the assembling station to compress the wiper pad therebetween and position said upper edges within the projected confines of the side walls of the U-shaped clip, means for pushing the clip from said first carrier onto said plates and the folded wiper pad therebetween, and means for ejecting the folded wiper pad from between said plates to cause the pad to push the U-shaped clip off of the plates into assembled relation with the pad.

7. An apparatus for folding wiper pads and assembling them in U-shaped clips with side walls comprising a first carrier having a plurality of nests for supporting U-shaped clips with the side walls thereof extending downwardly, a second carrier having a plurality of holders, each of said holders comprising a pair of relatively thin flexible plates mounted in spaced and parallel relation to each other and having smooth upper edges, means on said holders for supporting and aligning a flat pad adjacent the upper edges of said plates, means engageable with an intermediate portion of the pad for pushing it between said plates to fold it and cause it to be retained therebetween, means mounting said carriers with a portion of the first carrier disposed above a portion of the second carrier at an assembling station, means for indexing said first and said second carriers to advance successive folded pads and clips into vertical alignment at said assembling station, a pair of jaws disposed on opposite sides of said plates at the assembling station, means for actuating the jaws to flex the upper portion of the folding plates towards each other at the assembling station to compress the wiper pad therebetween and position the upper edges of the folding plates within the projected confines of the side walls of the U-shaped clip, means for pushing the clip from said first carrier onto said plates and the folded pad therebetween, means for ejecting the folded wiper pad from between said plates to cause the pad to push the U-shaped clip off of the plates into assembled relation with the pad, and control means for operating said folding means, said indexing means, said pushing means, said jaw actuating means, and said ejecting means in a predetermined sequence.

8. In an apparatus for folding wiper pads and assembling them in U-shaped clips, the combination of a pair of thin flat members, means for supporting the members in opposed and spaced relation to each other for receiving a folded pad therebetween and for receiving a U-shaped clip thereover, means for supporting a flat pad of material in alignment with and in close proximity to the pair of members, means engageable with the central portion of the flat pad for folding and pressing it between the members, means for moving the members towards each other to compress the pad therebetween and to position the members for receiving a U-shaped clip thereover, means for pressing the U-shaped clip over the members and the folded pad therebetween, means movable between the members for pushing the folded pad and the U-shaped clip from the members into assembled relation with each other, and means for mounting the members and the several means in predetermined relation to each other and for relative movement therebetween whereby the members and the several means may be brought sequentially into predetermined aligned and operative relation to each other and the pad folded and pressed between the members, the members moved together to compress the folded pad, the clip pressed onto the members and the folded pad therebetween, and the folded pad and the U-shaped clip ejected from the members into assembled relation with each other.

References Cited in the file of this patent

UNITED STATES PATENTS

| | | |
|---|---|---|
| 1,243,728 | Gagnon | Oct. 23, 1917 |
| 1,839,429 | Weaver | Jan. 5, 1932 |
| 1,884,683 | Hermani | Oct. 25, 1932 |
| 2,237,359 | Ott | Apr. 8, 1941 |
| 2,268,333 | Hiering | Dec. 30, 1941 |
| 2,296,964 | Ushakoff | Sept. 29, 1942 |

FOREIGN PATENTS

| | | |
|---|---|---|
| 683,202 | France | Feb. 25, 1930 |